United States Patent [19]

Takahashi et al.

[11] Patent Number: 4,595,335
[45] Date of Patent: Jun. 17, 1986

[54] PICK AND PLACE UNIT

[75] Inventors: Naoki Takahashi, Yokohama; Osamu Higuchi, Ibaragi; Seii Miyakawa, Yokohama; Masahito Uno, Chigasaki; Hiroshi Sato, Yokohama, all of Japan

[73] Assignee: Hitachi, Ltd., Tokyo, Japan

[21] Appl. No.: 523,788

[22] Filed: Aug. 16, 1983

[30] Foreign Application Priority Data

Aug. 25, 1982 [JP]  Japan ................................ 57-146154
Dec. 24, 1982 [JP]  Japan ................................ 57-226035

[51] Int. Cl.$^4$ .............................................. B65G 65/00
[52] U.S. Cl. .................................... 414/744 R; 74/526; 414/750; 901/11; 901/16; 901/17
[58] Field of Search ........ 414/749, 750, 735, 751–753, 414/744 R, 744 A, 744 BC; 74/526, 527; 901/11, 12, 13, 16, 50, 17

[56] References Cited

U.S. PATENT DOCUMENTS

| 3,896,681 | 7/1975 | Boyle | 414/744 A |
| 4,130,205 | 12/1978 | Luthi | 414/749 |
| 4,191,301 | 3/1980 | Hickman et al. | 212/245 |
| 4,266,910 | 5/1981 | Pickard | 414/735 |
| 4,406,576 | 9/1983 | Inaba et al. | 414/735 |
| 4,514,136 | 4/1985 | Abe | 901/22 X |

Primary Examiner—Donald W. Underwood
Attorney, Agent, or Firm—Beall Law Offices

[57] ABSTRACT

Disclosed is a pick and place unit having a first moving plate movably supported by a fixed plate and a second movable moving plate supported by the first moving plate movably in the direction crossing the moving direction of the first moving plate. The pick and place unit comprises: a first rod-shaped member secured to the fixed plate and disposed along the moving direction of the first moving plate; a second rod-shaped member secured to the second moving plate and disposed along the moving direction of the second moving plate; a movable stopper secured to the first moving plate and having bores, each having portions different in width from each other, for receiving the first and second rod-shaped members respectively; a driving member for moving the movable stopper; and stators fixed at any desired positions of the first and second rod-shaped members, respectively, so as to sandwich the movable stopper and adapted to abut against the movable stopper.

21 Claims, 10 Drawing Figures

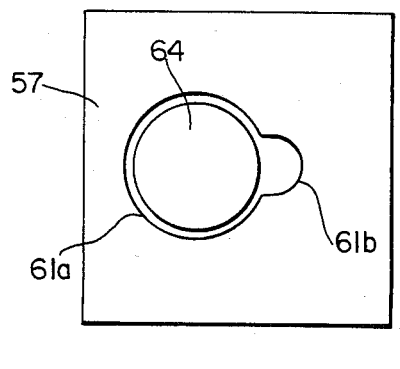
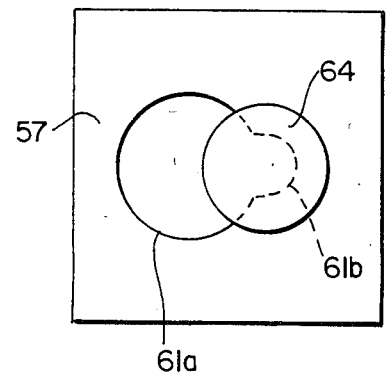
FIG. 7(a)　　　　　　FIG. 7(b)
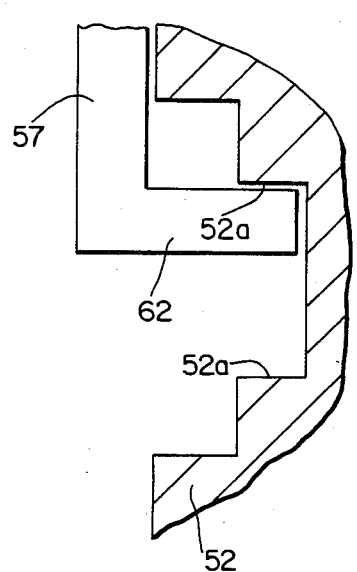
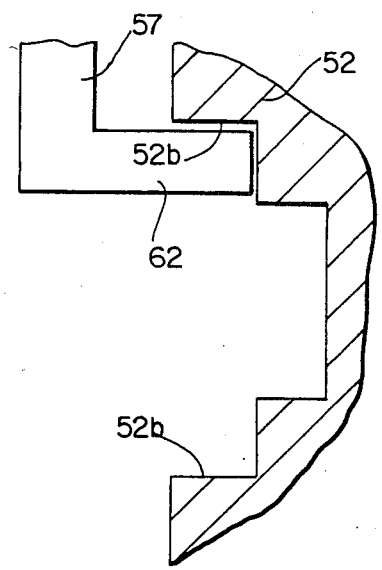
FIG. 8(a)　　　　　　FIG. 8(b)

PICK AND PLACE UNIT

BACKGROUND OF THE INVENTION

The present invention relates to a pick and place unit employed for feeding and mounting parts and more particularly to a pick and place unit most suitable for a mixed flow automation line for assembling electrical appliances for home use.

A pick and place unit is shown in FIG. 1. More specifically, a fixed plate 2 of the pick and place unit is secured to a base 1. A cylinder 3 is secured to the fixed plate 2. In addition, the fixed plate 2 is formed with a bore for slidably receiving the rod of the cylinder 3 and a pair of guide bores parallel to the former bore. The guide bores slidably receive respective guide bars 4. A first moving plate 5 is fixed to the one ends of the rod of the cylinder 3 and the guide bars 4 so as to be reciprocatively moved by the operation of the cylinder 3. The moving plate 5 also supports a cylinder 6 and is formed with a bore for slidably receiving the rod of the cylinder 6 and a pair of guide bores. Guide bars 7 are slidably received by the respective guide bores. A second moving plate 9 having at its end a chuck 8 for grasping parts is fixed to one ends of the rod of the cylinder 6 and the guide bars 7 so as to be reciprocatively moved by the operation of the cylinder 6. Moreover, in order to set the stop positions of the moving plates 5, 9, stoppers 10, 11 are provided to the guide bars 4, 7 respectively and collars 12 are provided to the respective rods of the cylinders 3, 6. (Collar 12 for cylinder 3 is not shown.)

SUMMARY OF THE INVENTION

It is a primary object of the invention to provide a pick and place unit having excellent general-purpose properties and high productivity coping with the need for the assembly line for a large variety-small lot production, by permitting the stop positions of the moving plates to be easily altered with a simple construction.

To this end, the invention features a combination of a movable abutment and fixed abutments by which it becomes possible to simultaneously alter the stop positions of a moving member in at least one moving direction.

Specifically, the pick and place unit according to the invention comprises: a base; a moving member; first means to move said moving member relative to said base; abutment means to limit movements of said moving member; and second means to change locations of said abutment means to control said movements of said moving member.

More specifically, the pick and place unit according to the invention comprises: a first moving plate movably supported by a fixed plate; a second moving plate supported by the first moving plate movably in the direction crossing the moving direction of the first moving plate; a first rod-shaped member disposed along the moving direction of the first moving plate; a second rod-shaped member disposed along the moving direction of the second moving plate; a movable stopper provided on the first moving plate and capable of being moved by a driving member in the direction crossing the first and second rod-shaped members as well as having bores for receiving the first and second rod-shaped members respectively, each of the bores having portions different in width from each other; and stators fixed at any desired positions of the first and second rod-shaped members, respectively, so as to sandwich the movable stopper and adapted to abut against the movable stopper.

BRIEF DESCRIPTION OF THE DRAWINGS

FIG. 7 (a), FIG. 7(b) illustrate the relationship in size between a bore in a movable stopper and a fixed stopper 64 of the pick and place unit shown in FIG. 6; and FIG. 8 (a), FIG. 8(b) illustrate the relationship between a projection of the movable stopper and a slot end of another fixed stopper of the pick and place unit shown in FIG. 6.

DESCRIPTION OF THE PREFERRED EMBODIMENTS

The pick and place unit with the previously described construction has a necessity to manually change the positions of the stoppers 10, 11 or replace the collars 12 in case of changing the stop positions of the moving plate 9; hence, the management of the pick and place unit is complicated. In addition, every time the parts picking-up position and the parts setting position are altered due to the change of type of a product to be assembled, the whole unit must be moved, which requires a troublesome work. Accordingly, the productivity is low, and the operation is hindered from becoming unmanned. On the other hand, a system wherein a plurality of such units are installed in parallel for coping with the change of type of a product to be assembled wastefully requires a large space and also has a problem of troublesome maintenance. Moreover, such a unit wherein the stoppers are displaced for the positional regulation is lacking in general-purpose properties, since the unit is able to effect the positional regulation in only the longitudinal direction of each of the cylinders. Accordingly, when the prior art is applied to an automatic assembly process for a large variety-small lot production, the operating efficiency of the whole process is undesirably lowered, resulting in a lower productivity.

Figure 1:
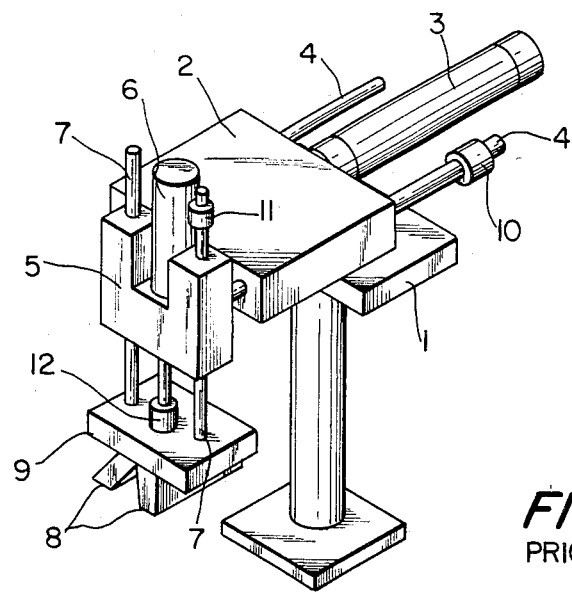
FIG. 1 is a perspective view of a conventional pick and place unit.
Figure 2:
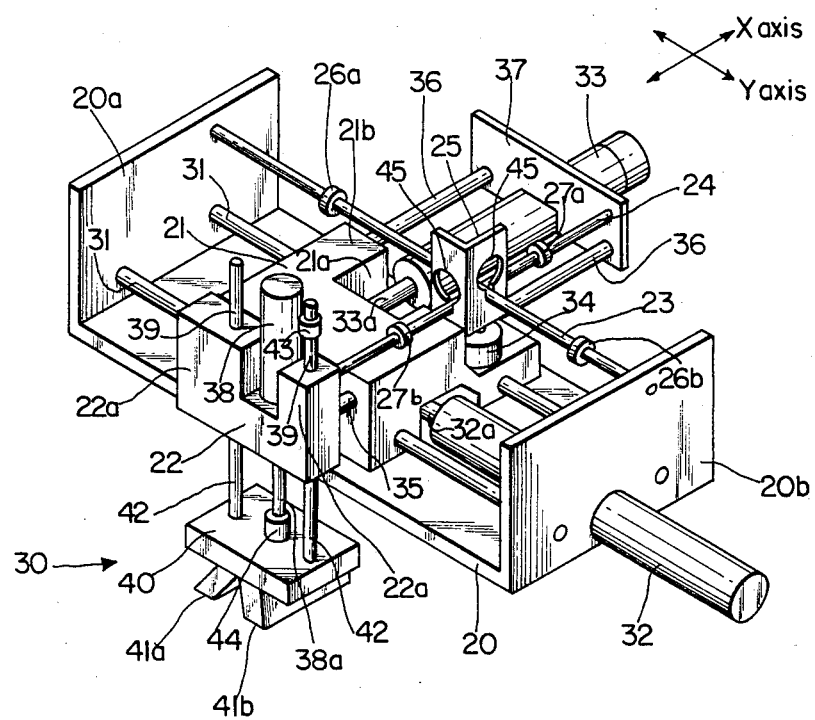
FIG. 2 is a perspective view of a pick and place unit in accordance with a preferred embodiment of the invention.

A pick and place unit in accordance with a preferred embodiment of the invention will be described hereinunder with reference to the accompanying drawings. The pick and place unit, as mainly shown in FIG. 2, comprises a fixed plate 20, a first moving plate 21, a second moving plate 22, a first rod-shaped member 23, a second rod-shaped member 24, a movable stopper 25, stators 26a, 26b fixed to the first rod-shaped member 23, and stators 27a, 27b fixed to the second rod-shaped member 24. The first rod-shaped member 23 is disposed along the moving direction (Y-axis direction) of the first moving plate 21, while the second rod-shaped member 24 is disposed along the moving direction (X-axis direction) of the second moving plate 22. The movable stopper 25 is mounted on the first moving plate 21 and adapted to receive each of the first and second rod-shaped members 23, 24. Consequently, each of the stators 26a, 26b, 27a, 27b retained at any desired positions on the first and second rod-shaped members 23, 24, respectively, will abut against the movable stopper 25. As a result, a chuck 30 supported by the second moving plate 22 is able to move between any desired two points in each of biaxial directions on a horizontal plane. Moreover, by moving the movable stopper 25, the stop positions of the chuck 30 can be simultaneously as well as automatically changed over in one operation.

The construction of the pick and place unit will be described hereinunder more specifically.

The fixed plate 20 is formed into a U shape with its ends upwardly bent. Two rod-shaped rails 31 are carried between end panels 20a, 20b of the fixed plate 20. In addition, an air cylinder 32 is fixed to one end panel 20b. The air cylinder 32 is disposed along the rod-shaped rails 31 and has a rod 32a with its end secured to the first moving plate 21. The first moving plate 21 is slidable on the rod-shaped rails 31, 31 received therein and has a recess 21a formed perpendicularly to the rod-shaped rails 31. An air cylinder 33 is secured to the first moving plate 21 and has a rod 33a penetrating therethrough in the X-axis direction. A branch portion 21b of the first moving plate 21 on its one side is formed into a low step on which a stopper-driving air cylinder 34 is fixed upwardly. The first moving plate 21 has guide bores 35 (only one of them is shown) formed in the branch portions 21b, 21b on both sides along the moving direction of the rod 33a.

The second moving plate 22 is secured to the distal end of the rod 33a and formed into a U shape with its branch portions 22a, 22a upwardly projecting. Rod-shaped rails 36, 36 are projected from the respective side surfaces of the branch portions 22a, 22a closer to the first moving plate 21 and are slidably received by the guide bores 35 of the first moving plate 21. The respective distal ends of the rod-shaped rails 36, 36 are secured to an end panel 37. The end panel 37 is notched at its central lower portion so as not to interfere with the air cylinder 33. An air cylinder 38 is downwardly disposed in the recess of the second moving plate 22 and has a rod 38a adapted to be slidable through the central portion of the second moving plate 22. The branch portions 22a, 22a have respective guide bores 39, 39 formed along the moving direction of the rod 38a. The chuck 30 comprises a flange 40, fingers 41a, 41b attached to the lower portion of the flange 40 and rod-shaped rails 42, 42 erected on the upper surface of the flange 40. The flange 40 is secured to the distal end of the rod 38a, and the rod-shaped rails 42, 42 are slidably received by the guide bores 39, 39.

Figure 3:
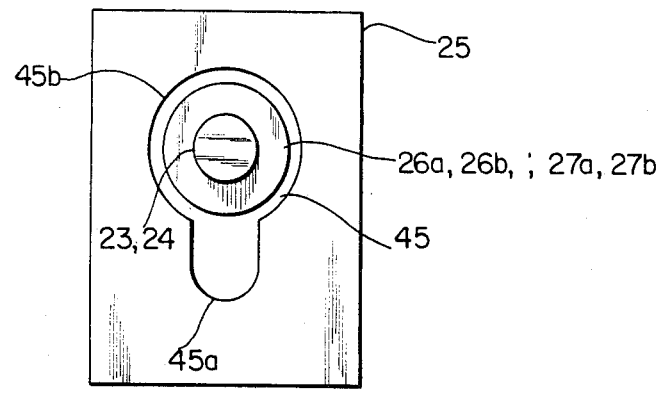
FIG. 3 illustrates the relationship in size among a bore in a movable stopper, a rod-shaped member and a stator of the pick and place unit shown in FIG. 2.

By the way, between the end panels 20a, 20b of the fixed plate 20, the first rod-shaped member 23 is carried along the moving direction of the first moving plate 21 and fitted with the stators 26a, 26b movably retained thereon. Similarly, between the second moving plate 22 and the end panel 37, the second rod-shaped member 24 is carried along the moving direction of the second moving plate 22 and has the stators 27a, 27b slidably retained thereon. The second rod-shaped member 24 is disposed below the first rod-shaped member 23 so as not to interfere with the latter in the vertical direction. The movable stopper 25 having an L-shaped cross section receiving these rod-shaped members 23, 24 is secured to the distal end of the rod of the stopper-driving air cylinder 34. The movable stopper 25 has a keyhole-shaped bore 45 opened in each of side surfaces in combination forming an L shape. Each bore 45 is, as shown in FIG. 3, constituted by the lower portion which is a small circular bore 45a and the upper portion which is a large circular bore 45b. Each small circular bore 45a has such an area that the rod-shaped member 23 or 24 is allowed to be received but the stators 26a, 26b or 27a, 27b are prevented from passing therethrough.

It is to be noted that, in order to restrict the vertical movement of the chuck 30, stators 43 and 44 are movably mounted on one of the rod-shaped rails 42 and the rod 38a, respectively.

Figure 4:
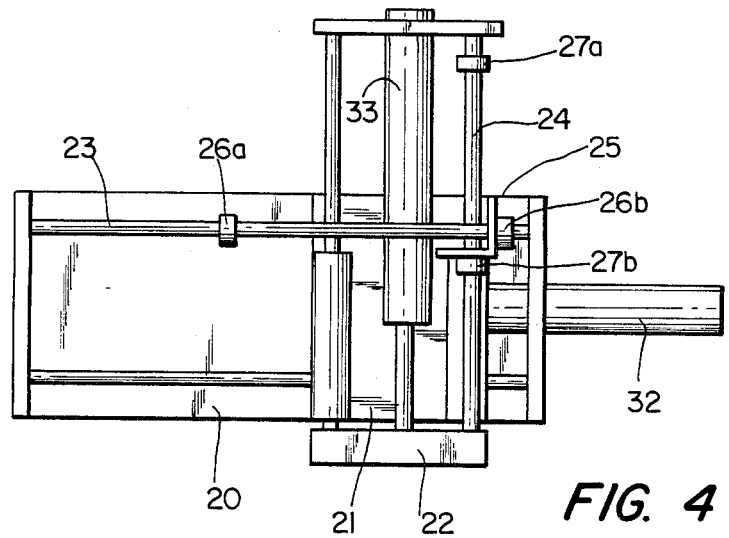
FIGS. 4 and 5 are plan views showing the operation of the pick and place unit shown in FIG. 2.
Figure 5:
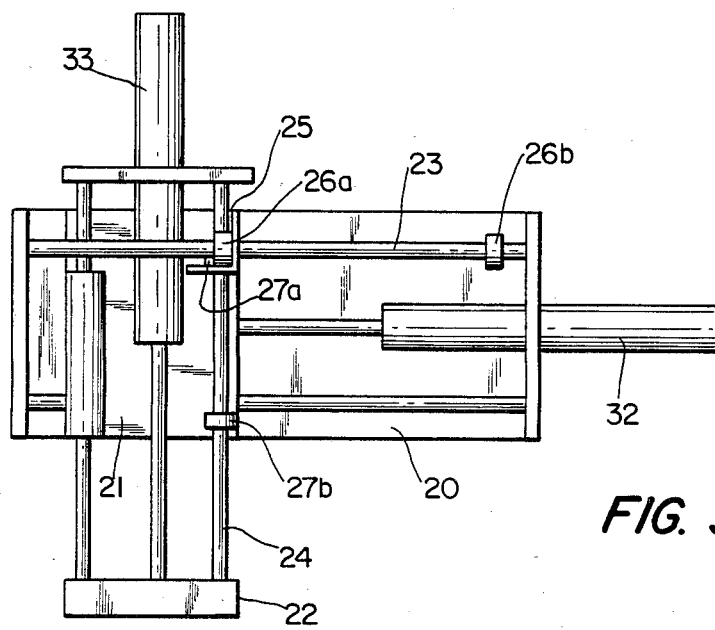

In the above construction, when the air cylinder 32 is contracted under the state where the movable stopper 25 is raised through the stopper-driving air cylinder 34, as clearly shown in FIG. 4, one side surface of the movable stopper 25 abuts against the stator 26b, so that the first moving plate 21 is stopped. Next, when the air cylinder 33 is contracted, the stator 27b abuts against the other side surface of the movable stopper 25, so that the second moving plate 22 is stopped. On the other hand, when both the air cylinders 32 and 33 are expanded, the stators 26a and 27a abut against the other sides of the respective side surfaces of the movable stopper 25, so that the first and second moving plates 22, 23 are stopped.

Next, when the movable stopper 25 is lowered, the rod-shaped members 23, 24 will pass through the centers of the large circular bores 45b of the bores 45, respectively, allowing the stators 26a, 26b and 27a, 27b to freely pass through the large circular bores 45b of the movable stopper 25, respectively. Consequently, when the air cylinders 32 and 33 are actuated, the first and second moving plates 21 and 22 are moved to the stroke ends of the air cylinders 32 and 33, respectively.

Accordingly, under the state where the stopper-driving air cylinder 34 (see FIG. 2) is contracted, the second moving plate 22 can select four stop positions according to the combination of expansion and contraction of the air cylinders 32, 33. Also under the state where the stopper-driving air cylinder 34 is expanded, the second moving plate 22 can obtain four stop positions in the same manner. Therefore, the embodiment permits the second moving plate 22 to select a total of eight stop positions in the horizontal direction. Moreover, the selection can be effected automatically and in one operation. In addition, since the construction is simple, there is no problem of cost. Further, the chuck 30 (see FIG. 2) moves at each stop position of the second moving plate 22 while being restricted by the stators 43, 44 in the vertical direction. Thereby, the invention can be flexibly applied to any large variety-small lot production, and a high productivity can be expected.

Although the air cylinder in exemplified as the means for moving each member in the above description, the air cylinder is not exclusive and an oil cylinder or motor-driven system may be employed.

According to the embodiment, it is possible to provide a pick and place unit having excellent general-purpose properties and a high productivity coping with the need for an assembly line for a large variety-small lot production, since the change in strokes on two axes perpendicular to each other can be effected simultaneously.

Next, another preferred embodiment of the invention will be described hereinunder with reference to FIGS. 6 through 8.

Figure 6:
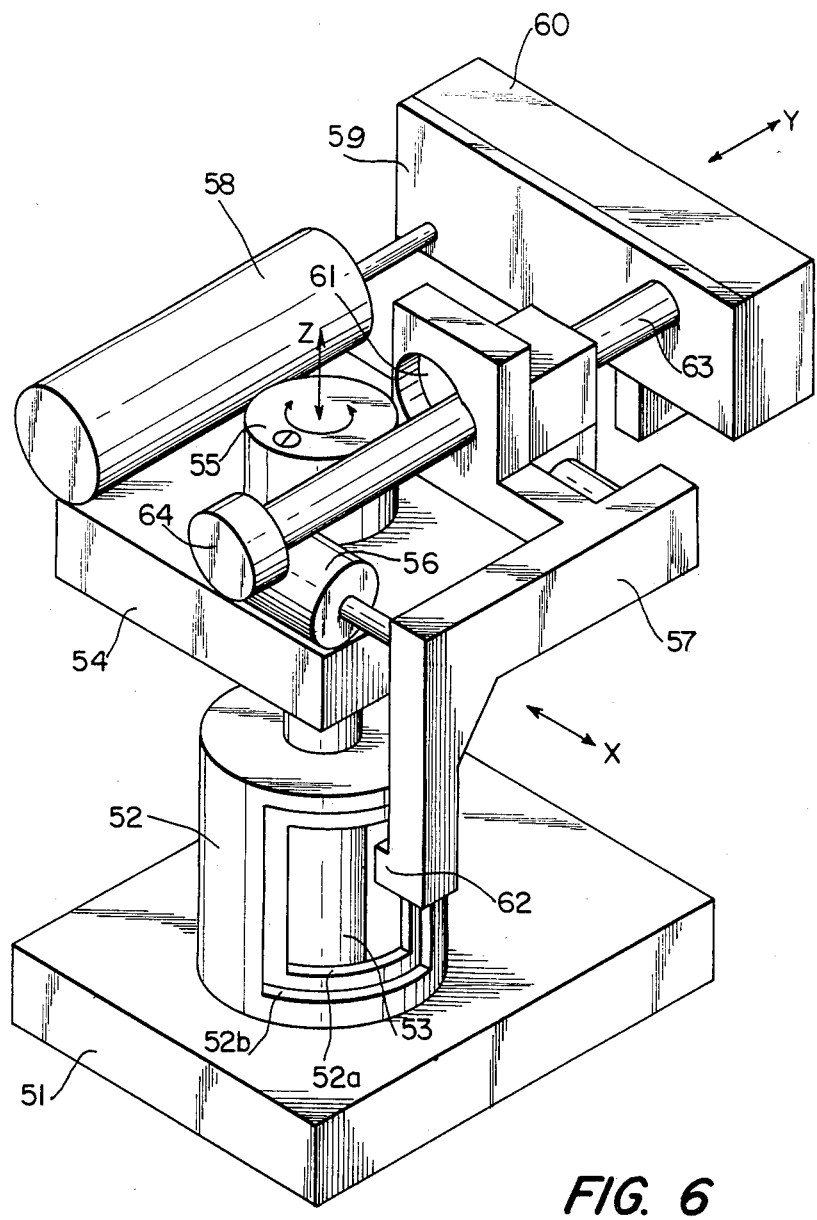
FIG. 6 is a perspective view of a pick and place unit in accordance with another preferred embodiment of the invention.

Referring now to FIG. 6 which is a perspective view of a pick and place unit in accordance with the second preferred embodiment of the invention, the pick and place unit has a first moving block 54 movable in both θ and Z directions with respect to a fixed block 51, an air cylinder 53 for moving the first moving block 54 in the Z direction, and a rotary actuator 55 for moving the first moving block 54 in the θ direction. The first moving block 54 has an air cylinder 58 for moving a second moving block 59 in the Y direction. Moreover, the second moving block 59 has a chuck 60 fixed thereto. An air cylinder 56 is disposed on the first moving block of this pick and place unit and supports a movable stopper 57. The movable stopper 57 is formed with a keyhole-shaped bore 61 having an axis in the Y direction as well as a projection 62 formed in the direction for fitting, in both Z and θ directions in a slot of a fixed stopper 52 installed on the outer periphery of the air cylinder 53. The slot has at least one slot end, formed into a step shape, functioning as an abutment surface of the stopper. In addition, one end of a fixing bar 63 slidably received by the bore 61 is attached to the second moving block 59. Moreover, the fixing bar 63 has at the other end thereof a fixed stopper 64 having such a size that the fixed stopper 64 is allowed to pass through a large-diameter portion 61a of the bore 61 but is prevented from passing through a small-diameter portion 61b.

In the above construction, when the cylinder 58 is expanded under the state where the cylinder 56 of the movable stopper 57 is contracted, the movable stopper 57 abuts against the fixed stopper 64 as shown in FIG. 7b, so that the second moving block is stopped. When the cylinder 53 is expanded, the projection 62 of the movable stopper 57 abuts against an inner slot end 52a of the fixed stopper 52 as shown in FIG. 8a, so that the second moving block is stopped. On the other hand, when the rotary actuator 55 is rotated, the projection 62 of the movable stopper 57 abuts against an inner slot end 52a of the fixed stopper 52 as shown in FIG. 8a, so that the second moving block is stopped.

According to the above-mentioned combination of the operations of the cylinders and the rotary actuator, the second moving block 59 can obtain eight stop positions.

Next, under the state where the cylinder 56 for driving the movable stopper 57 is expanded, the fixed stopper 64 is allowed to pass through the bore of the movable stopper 57 as shown in FIG. 7a. Therefore, when the air cylinder 58 is expanded and contracted, the second moving block 59 is moved between the stroke ends of the air cylinder 58. Moreover, since the projection 62 of the movable stopper 57 moves outwardly, when the air cylinder 53 is expanded and contracted, the first moving block 54 is stopped at such points that the projection 62 abuts against either outer slot end 52b of the fixed stopper 52 as shown in FIG. 8b. Also in case of rotating the rotary actuator 55, the first moving block 54 is similarly stopped at such points that the projection 62 abuts against either outer slot end 52b.

According to the above-mentioned combination of the operations of the cylinders and the rotary actuator, the second moving block 59 can obtain eight stop positions.

Consequently, the second moving block 59 can obtain sixteen stop positions if the stop positions obtained in the state where the movable stopper 57 is raised and lowered are added together. By attaching the chuck 60 to the second moving block 59, it is possible to obtain a flexible pick and place unit.

As described above, according to this embodiment, it is possible to obtain a variable stroke pick and place unit with a sample mechanism capable of simultaneously effecting stroke alteration in the three directions, i.e., Y, θ and Z, by moving only one movable stopper.

As will be fully understood from the foregoing description, according to the invention, the chuck position is changed simply by changing over the stopper positions from one to another. Therefore, it is possible to allow a single pick and place unit to perform the work of several pick and place units. Moreover, pick and place units can be easily replaced in each step. Furthermore, it is possible to largely improve the operating efficiencies of each pick and place unit and the manufacturing line employing the same. In addition, the number of restrictions on the formation of the manufacturing line can be decreased and moreover, the length of thereof can be favorably reduced.

Although the invention has been described through specific terms, it is to be noted here that the described embodiments are not exclusive and various changes and modifications may be imparted thereto without departing from the scope of the invention which is limited solely by the appended claims.

What is claimed is:

1. Apparatus comprising:
    a first member,
    a second member movably mounted relative to said first member,
    first drive means for repeatedly moving said second member relative to said first member along a path,
    first abutment means supported by said first member,
    second abutment means supported by said second member to limit the movement of said second member in at least two different ranges of substantial movement along the path relative to said first member in combination with said first abutment means,
    second drive means for moving one of said abutment means relative to the other said abutment means to select one of said ranges of said movement of said second member relative to said first member
    said second abutment means limiting the movement of said second member at both of the ends of each of said ranges along the path of said second member,
    said second drive means moving said one abutment means in a direction crossing said path, and
    one of said abutment means having two bores different in width and the other of said abutment means having at least one stator which is such width to be passed through only one of said two bores to limit the movement of said second member relative to said first member in combination with said two bores different in width.

2. Apparatus according to claim 1, wherein said two bores different in width form a keyhole-shaped bore.

3. Apparatus according to claim 1, wherein said other of said abutment means has a rod-shaped member disposed along the path of said second member and said stator is mounted on said rod-shaped member to change the limit of the movement of said second member in combination with one of said bores.

4. Apparatus comprising:
    a first member, a second member movably mounted relative to said first member, first drive means for repeatedly moving said second member relative to said first member along a path, first abutment means supported by said first member, second abutment means supported by said second member to limit the movement of said second member in at least two different ranges of substantial movement along the path relative to said first member in combination with said first abutment means, second drive means for moving one of said abutment means relative to the other said abutment means to select one of said ranges of said movement of said second member relative to said first member said second abutment means limiting the movement of said second member at both of the ends of each of said ranges along the path of said second member, and said one of said abutment means having stepped slot ends which have slot ends different in width and the other of said abutment means having a projector movable to change the limit of the movement of said second member in combination with one of said slot ends.

5. A pick and place unit, comprising:

a base, a moving member, first means to move said moving member repeatedly in at least two dimensions relative to said base, abutment means to limit movements of said moving member, in at least two different ranges of substantial movement in said two dimensions respectively, second means to change simultaneously, in said two dimensions, locations of said abutment means to control said ranges of movement of said moving member, said abutment means having a movable abutment and fixed abutments and said second means changing simultaneously limits of the movement of said moving member in said two dimensions by moving only said movable abutment, said first means including at least one compressible gas cylinder, said moving member moving repeatedly along a path from an end to the other end of the path by said first means and said abutment means limiting the movement of said moving member at both of the ends of the path of said moving member, said abutment means having adjustable means to change the limits of the movement of said moving member, and said abutment means having two bores different in width and stators which are of such width to be passed through only one of said two bores to limit the movement of said moving member relative to said base in combination with said two bores different in width.

6. A pick and place unit according to claim 5, wherein said two bores different in width form a keyhole-shaped bore.

7. A pick and place unit according to claim 5, wherein said abutment means has rod-shaped members disposed along the two dimensions of movement of said moving member, respectively, and said stators are fixed to said rod-shaped members so as to sandwich said two bores different in width and adapted to abut against only the other of said two bores.

8. A pick and place unit, comprising:

a base, a moving member, first means to move said moving member repeatedly in at least two dimensions relative to said base, abutment means to limit movements of said moving member, in at least two different ranges of substantial movement in said two dimensions respectively, second means to change simultaneously, in said two dimensions, locations of said abutment means to control said ranges of movement of said moving member, said abutment means having a movable abutment and fixed abutments and said second means changing simultaneously limits of the movement of said moving member in said two dimensions by moving only said movable abutment, said first means including at least one compressible gas cylinder, said moving member moving repeatedly along a path from an end to the other end of the path by said first means and said abutment means limiting the movement of said moving member at both of the ends of the path of said moving member, and said abutment means having stepped slot ends and at least one projector movable to change the limit of the movement of said moving member in combination with one of said slot ends.

9. A pick and place unit, comprising:

a base, a first moving member movably mounted relative to said base along a path, a second moving member movably mounted relative to said first moving member along a path crossing the path of said first moving member, first drive means for moving said first moving member, second drive means for moving said second moving member, first abutment means supported by said base, second abutment means supported by said second moving member, third abutment means supported by said first moving member to limit the movement of said first moving member relative to said base in combination with said first abutment means and the movement of said second moving member relative to said first moving member in combination with said second abutment means, and third drive means for changing simultaneous relative locations of said third abutment means to each of said first and second abutment means to control said movements of said first moving member and said second moving member.

10. A pick and place unit according to claim 9, wherein said third abutment means has a movable abutment movably supported by first member, and said first and second abutment means have abutments fixed respectively to said base and second moving member; and said third drive means changes simultaneously limits of the movement of said first moving member and second moving member by moving only said movable abutment in a direction crossing the path of said first moving member relative to said fixed abutments.

11. A pick and place unit according to claim 10, wherein said first drive means and said second drive means include at least one compressible gas cylinder.

12. A pick and place unit according to claim 11, wherein said first moving member is moved from one end to the other end along its path by said first drive means and said second moving member is moved from an end to the other end along its path crossing the path by said second drive means, said third abutment means limits the movement of said first moving member at both of the ends of its path in combination with said first abutment means and the movement of said second moving member at both of the ends of its path in combination with said second abutment means.

13. A pick and place unit according to claim 12, wherein at least one of said abutment means has adjustable means to change limits of the movements of said first and said second moving member.

14. A pick and place unit according to claim 13, wherein said third abutment means has two bores different in width and said first and said second abutment means have stators to limit the movements of said first moving member and said second moving member in combination with said two bores different in width.

15. A pick and place unit according to claim 14, wherein said two bores different in width form a keyhole-shaped bore.

16. A pick and place unit according to claim 14, wherein said first abutment means has at least one rod-shaped member disposed along the path of said first moving member, said second abutment means has at least one rod-shaped member disposed along the path of said second moving member, said stators are fixed to said rod-shaped members so as to sandwich said two bores different in width and adapted to abut against the smaller one of said two bores.

17. A pick and place unit according to claim 12, wherein said first abutment means has stepped slot ends and said third abutment means has a projector to change the limit of the movement of said first moving member and said second moving member in combination with one of said slot ends.

18. A pick and place unit according to claim 11, wherein at least one of said abutment means has adjustable means to change limits of the movements of said first and said second moving member.

19. A pick and place unit according to claim 11, wherein said base is fixed.

20. A pick and place unit according to claim 9, wherein said first moving member is mounted to be rotatable and translatable in two dimensions relative to said base and said second moving member is mounted to be translatable in a third dimensions.

21. A pick and place unit according to claim 9, wherein said first moving member is translationally movable relative to said base in two different directions and said second moving member is translationally movable in a direction crossing said two directions.

* * * * *